United States Patent
Seo et al.

(10) Patent No.: US 9,144,043 B2
(45) Date of Patent: Sep. 22, 2015

(54) METHOD FOR ACQUIRING TIME SYNCHRONIZATION IN A HETEROGENEOUS NETWORK AND APPARATUS FOR THE SAME

(75) Inventors: Hanbyul Seo, Anyang-si (KR); Inkwon Seo, Anyang-si (KR); Kijun Kim, Anyang-si (KR); Joonkui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 14/131,888

(22) PCT Filed: Jul. 20, 2012

(86) PCT No.: PCT/KR2012/005819
§ 371 (c)(1),
(2), (4) Date: Jan. 9, 2014

(87) PCT Pub. No.: WO2013/012286
PCT Pub. Date: Jan. 24, 2013

(65) Prior Publication Data
US 2014/0140337 A1    May 22, 2014

Related U.S. Application Data

(60) Provisional application No. 61/510,044, filed on Jul. 20, 2011, provisional application No. 61/522,225, filed on Aug. 10, 2011.

(51) Int. Cl.
*H04B 7/212* (2006.01)
*H04J 3/06* (2006.01)
(Continued)

(52) U.S. Cl.
CPC .......... *H04W 56/00* (2013.01); *H04W 56/0015* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 6,370,111 B1 * | 4/2002 | Takeda et al. | 370/216 |
| 2004/0018842 A1 * | 1/2004 | Yu | 455/437 |
| 2004/0057395 A1 * | 3/2004 | Sakuma | 370/318 |

(Continued)

FOREIGN PATENT DOCUMENTS

| | | |
|---|---|---|
| KR | 20100072357 A | 6/2010 |
| KR | 10-2010-0131304 A | 12/2010 |

(Continued)

*Primary Examiner* — Chi H Pham
*Assistant Examiner* — Soon-Dong D Hyun
(74) *Attorney, Agent, or Firm* — Dentons US LLP

(57) ABSTRACT

The present invention relates to a wireless communication system. More particularly, the present invention relates to a method for acquiring time synchronization in a wireless communication system, and to an apparatus for the method, wherein the method comprises the steps of: obtaining information on a discontinuous transmission pattern of a synchronous channel; attempting detection of a synchronous channel of a base station; and, if said detection fails, continuously attempting detection of the synchronous channel of the base station during a predetermined time period. If the base station is of a first type, said predetermined time period is set to be the same as or longer than the time period in which the synchronous channel is continuously not transmitted in said discontinuous transmission pattern. If the base station is of a second type, said predetermined time period is set to be the same as or longer than the time period in which the synchronous channel is continuously transmitted in said discontinuous transmission pattern.

12 Claims, 12 Drawing Sheets

Note:
T1 : (minimum) number of radio frames in which HeNB SCH is contiguously transmitted
b : integer equal to 0 or greater than 0, preferably, equal to 1 or greater than 1

(51) Int. Cl.
*H04W 56/00* (2009.01)
*H04W 24/02* (2009.01)

(56) References Cited

U.S. PATENT DOCUMENTS

2009/0280819 A1 11/2009 Brisebois et al.
2010/0296454 A1* 11/2010 Park et al. .................... 370/328
2010/0322227 A1 12/2010 Luo
2012/0020202 A1* 1/2012 Liu et al. ...................... 370/216
2013/0310094 A1* 11/2013 Ho et al. ...................... 455/502

FOREIGN PATENT DOCUMENTS

KR 10-2010-0139109 A 12/2010
WO 2009/054058 A1 4/2009

* cited by examiner

Note:

T2 : (maximum) number of radio frames in which HeNB SCH is not contiguously transmitted a : integer equal to 0 or greater than 0, preferably, equal to 1 or greater than 1

Note :

T1 : (minimum) number of radio frames in which HeNB SCH is contiguously transmitted
b : integer equal to 0 or greater than 0, preferably, equal to 1 or greater than 1

METHOD FOR ACQUIRING TIME SYNCHRONIZATION IN A HETEROGENEOUS NETWORK AND APPARATUS FOR THE SAME

This application is a 35 USC §371 National Stage entry of International Application No. PCT/KR2012/005819, filed on Jul. 20, 2012, and claims priority to U.S. Provisional Application Nos. 61/510,044 filed Jul. 20, 2011 and 61/522,225 filed Aug. 10, 2011, all of which are hereby incorporated by reference in its entirety.

TECHNICAL FIELD

The present invention relates to a wireless communication system, and more particularly, to a method of mitigating inter-cell interference and apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Tasks

One object of the present invention is to provide a method of resolving inter-cell interference and apparatus therefor. Another object of the present invention is to provide a method of efficiently acquiring time synchronization in a heterogeneous network and apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of acquiring time synchronization in a wireless communication system includes the steps of obtaining information on a non-contiguous transmission pattern of a synchronization channel, detecting a synchronization channel of a base station, and re-detecting of the synchronization channel of the base station for a predetermined time if the detection process fails, wherein if the base station corresponds to a first type, the predetermined time is equal to or greater than a duration for which a synchronization channel is not contiguously transmitted in the non-contiguous transmission pattern, and wherein if the base station corresponds to a second type, the predetermined time is equal to or greater than a duration for which a synchronization channel is contiguously transmitted in the non-contiguous transmission pattern.

To further achieve these and other advantages and in accordance with the purpose of the present invention, according to a different embodiment, a communication device configured to acquire time synchronization in a wireless communication system includes a radio frequency (RF) unit and a processor, the processor configured to obtain information on a non-contiguous transmission pattern of a synchronization channel, to detect a synchronization channel of a base station; and to re-detect of the synchronization channel of the base station for a predetermined time if the detection process fails, wherein if the base station corresponds to a first type, the predetermined time is equal to or greater than a duration for which a synchronization channel is not contiguously transmitted in the non-contiguous transmission pattern, and wherein if the base station corresponds to a second type, the predetermined time is equal to or greater than a duration for which a synchronization channel is contiguously transmitted in the non-contiguous transmission pattern.

Preferably, if the base station corresponds to the first type, the predetermined time is set to a maximum duration for which a synchronization channel is not contiguously transmitted in the non-contiguous transmission pattern in a manner of being equal to the maximum duration or greater than the maximum duration.

Preferably, if the base station corresponds to the second type, the predetermined time is set to a minimum duration for which a synchronization channel is contiguously transmitted in the non-contiguous transmission pattern in a manner of being equal to the minimum duration or greater than the minimum duration.

Preferably, the non-contiguous transmission pattern of the synchronization channel is defined for the first type base station.

Preferably, the first type base station includes a home base station and the second type base station includes a macro base station.

Preferably, the information on the non-contiguous transmission pattern of the synchronization channel is predetermined according to a cell identifier.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, according to the present invention, inter-cell interference can be resolved in a wireless communication system. Specifically, it is able to efficiently acquire time synchronization in a heterogeneous network.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). The UMTS is a $3^{rd}$ generation (3G) asynchronous mobile communication system operating in a Europe system-based wideband code division multiple access (WCDMA), a global system (GSM) for a mobile communication, and a general packet radio service (GPRS). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. And, a specific terminology used in the following description is provided to help the understanding of the present invention and the use of the specific terminology can be modified to a different form within a scope of a technical idea of the present invent.

In a wireless communication system, a user equipment receives information from a base station in downlink (DL) and transmits information to the base station in uplink (UL). The information transceived between the user equipment and the base station includes data and various control information. According to a type and usage of the information, there exist various physical channels.

Figure 1:
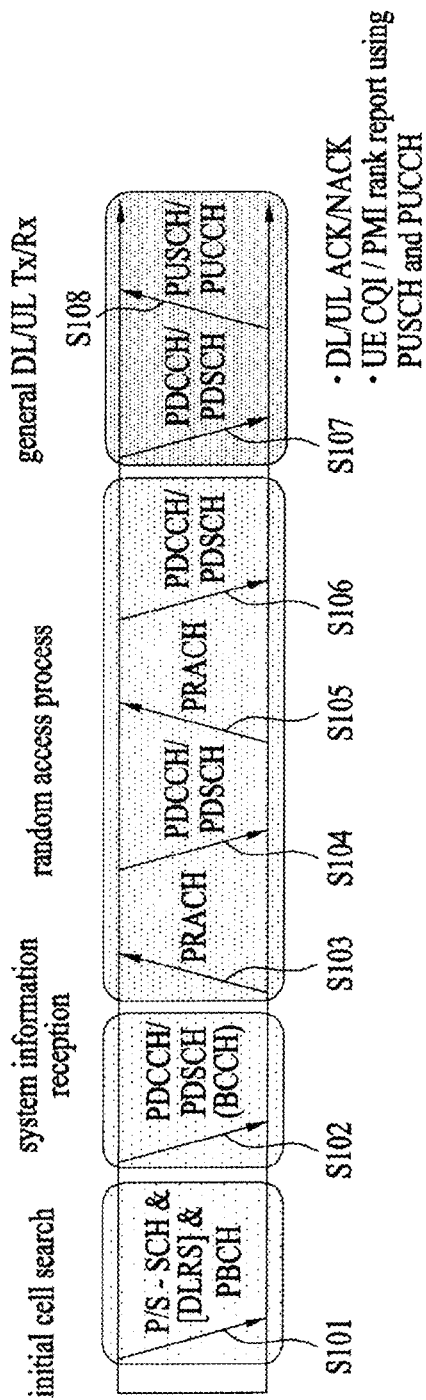
FIG. 1 is a diagram for explaining physical channels used for 3GPP LTE/LTE-A system and a general signal transmission method using the physical channels.

FIG. 1 is a diagram for explaining physical channels used for 3GPP LTE/LTE-A system and a general signal transmission method using the physical channels.

Referring to FIG. 1, if a power of a user equipment is turned on or the user equipment enters a new cell, the user equipment may perform an initial cell search job for matching synchronization with a base station and the like [S101]. To this end, the user equipment may match synchronization with the base station in a manner of receiving a primary synchronization channel (P-SCH) and a secondary synchronization channel (S-SCH) from the base station and may obtain information such as a cell ID and the like. Subsequently, the user equipment may receive a physical broadcast channel from the base station and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain detailed system information [S102].

Meanwhile, the user equipment may be able to perform a random access procedure to complete the access to the base station [S103 to S106]. To this end, the user equipment may transmit a preamble on a physical random access channel (PRACH) [S103] and may be then able to receive a response message via PDCCH and a corresponding PDSCH in response to the preamble [S104]. In case of a contention based random access, it may be able to perform a contention resolution procedure such as a transmission S105 of an additional physical random access channel and a channel reception S106 of a physical downlink control channel and a corresponding physical downlink shared channel.

Having performed the above mentioned procedures, the user equipment may be able to perform a PDCCH/PDSCH reception S107 and a PUSCH/PUCCH (physical uplink shared channel/physical uplink control channel) transmission S108 as a general uplink/downlink signal transmission procedure. Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CSI (channel status information), and the like. The CSI includes CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
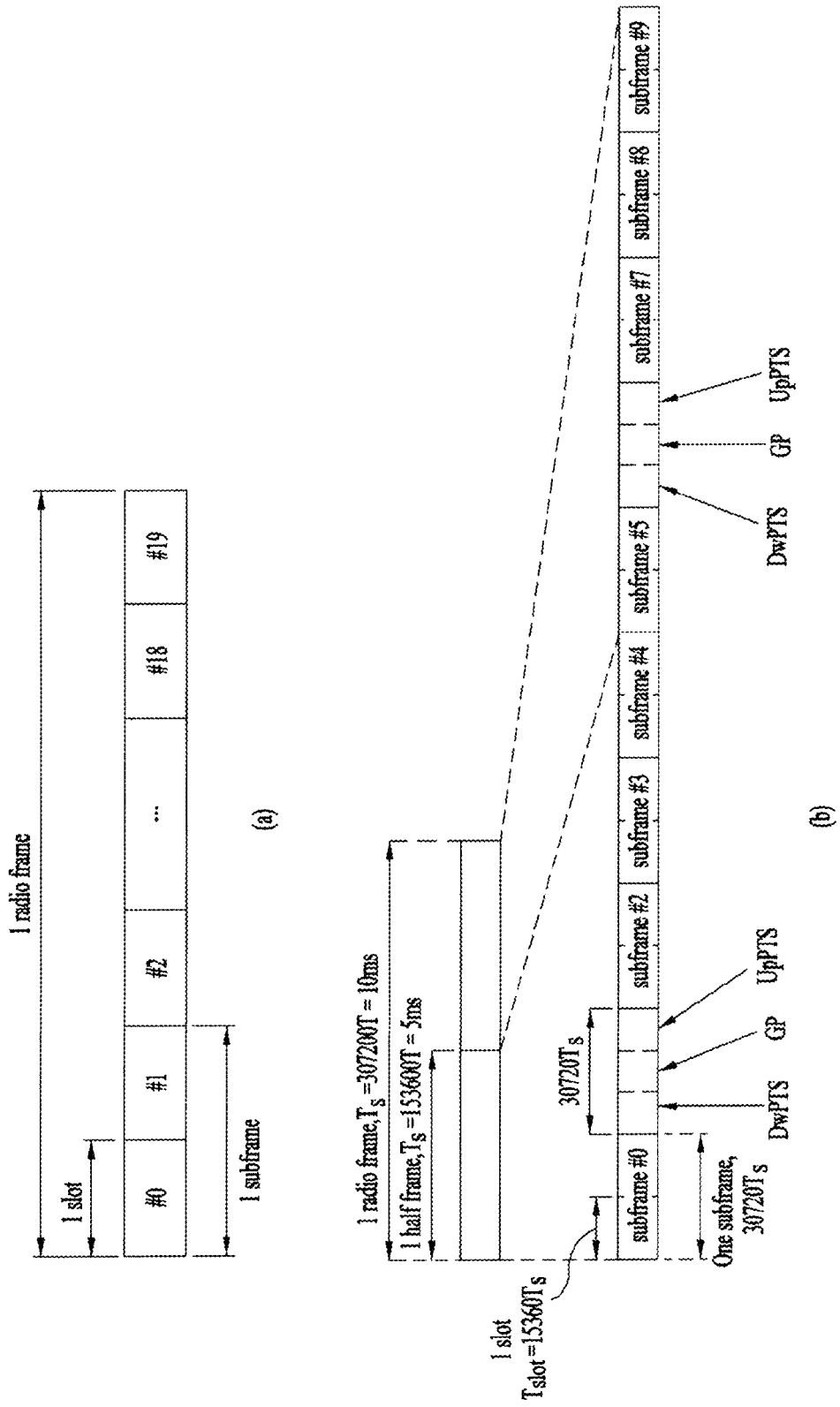
FIG. 2 is a diagram for an example of a radio frame structure.

FIG. 2 is a diagram for an example of a radio frame structure. A radio frame include a plurality of subframes and one subframe includes a plurality of OFDMs or SC-FDMA symbols. 3GPP LTE (-A) standard supports a type 1 radio frame structure for FDD (frequency division duplex) and a type 2 radio frame structure for TDD (time division duplex).

FIG. 2 (*a*) shows an example of a type 1 radio frame structure. A downlink radio frame consists of 10 subframes and one subframe consists of 2 slots in time domain. For instance, a length of a subframe corresponds to 1 ms and a length of one slot may correspond to 0.5 ms. One slot includes a plurality of OFDM symbols or a plurality of SC-FDMA symbols in time domain and includes a plurality of resource blocks (RB) in frequency domain. 3GPP LTE (-A) system uses OFDMA in DL and SC-FDMA in UL.

FIG. 2 (b) shows an example of a type 2 radio frame structure. A type 2 radio frame consists of 2 half frames. Each of the half frames consists of 4 normal subframes and one special subframe. The special subframe consists of a DwPTS (downlink pilot time slot), a GP (guard period) and an UpPTS (uplink pilot time slot). The DwPTS is used for initial cell search, synchronization or channel estimation in a user equipment. The UpPTS is used for channel estimation in a base station and uplink transmission synchronization of a user equipment. The guard period provides switching time between UL transmission and DL transmission. Each of the normal subframes is used for UL transmission or DL transmission in a radio frame according to UL-DL configuration (uplink-downlink configuration).

Figure 3:
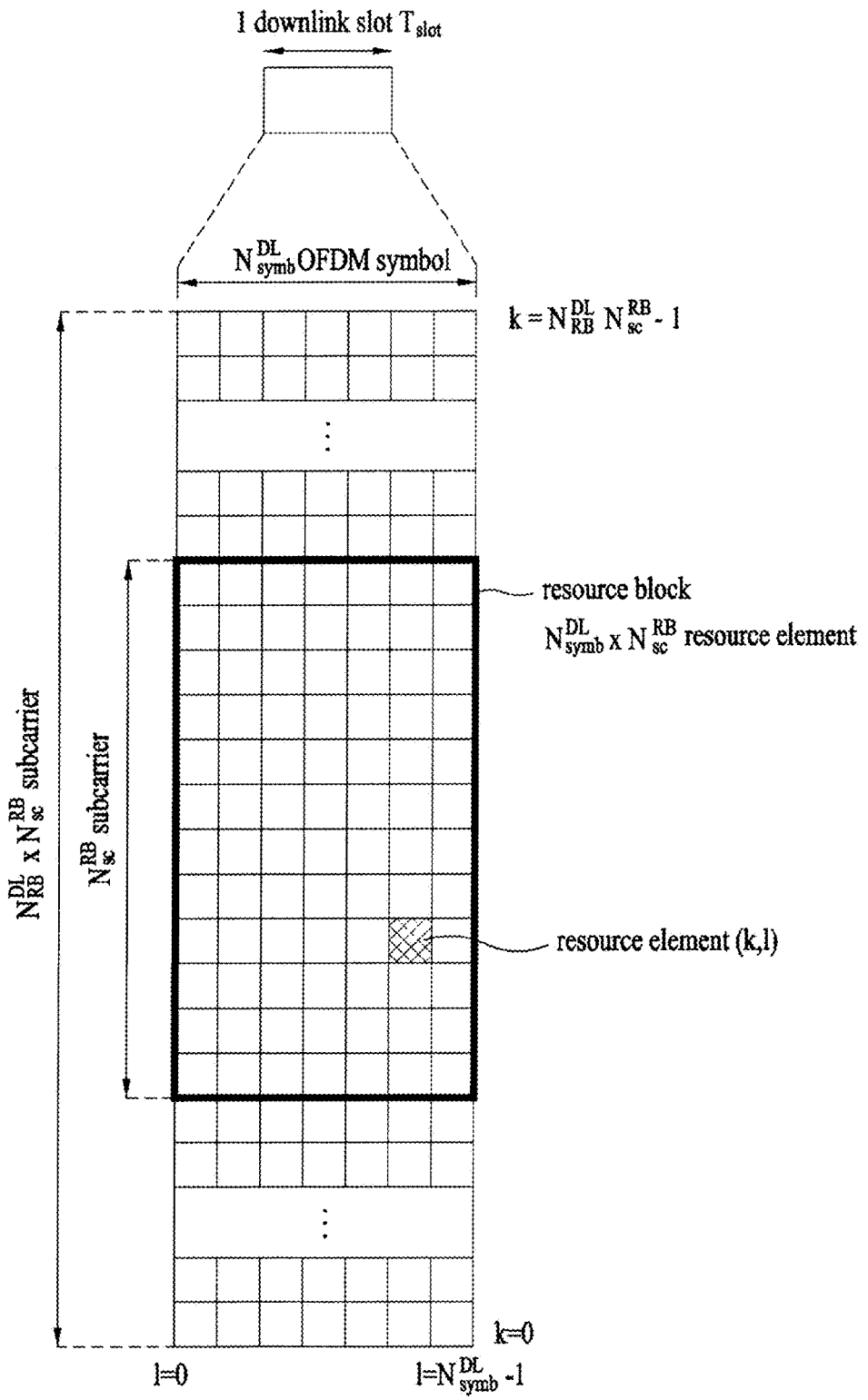
FIG. 3 is a diagram for an example of a resource grid of a downlink slot.

FIG. 3 is a diagram for an example of a resource grid of a downlink slot. A structure of an UL slot is identical to a structure of a DL slot. Yet, an OFDM symbol is replaced with an SC-FDMA symbol.

Referring to FIG. 3, one downlink (DL) slot may include a plurality of OFDM symbols in time domain. In particular, one DL slot exemplarily includes $N^{DL}_{symb}$ (e.g., 6 or 7) OFDM symbols and one resource block (RB) exemplarily includes $N^{RB}_{sc}$ (e.g., 12) subcarriers in frequency domain. Each element on a resource grid is called a resource element (RE). An RB includes $N^{RB}_{sc} \times N^{DL}_{symb}$ (e.g., 12×7 (6)) REs. The number $N^{DL}_{RB}$ of resource blocks may depend on a DL transmission bandwidth.

Figure 4:
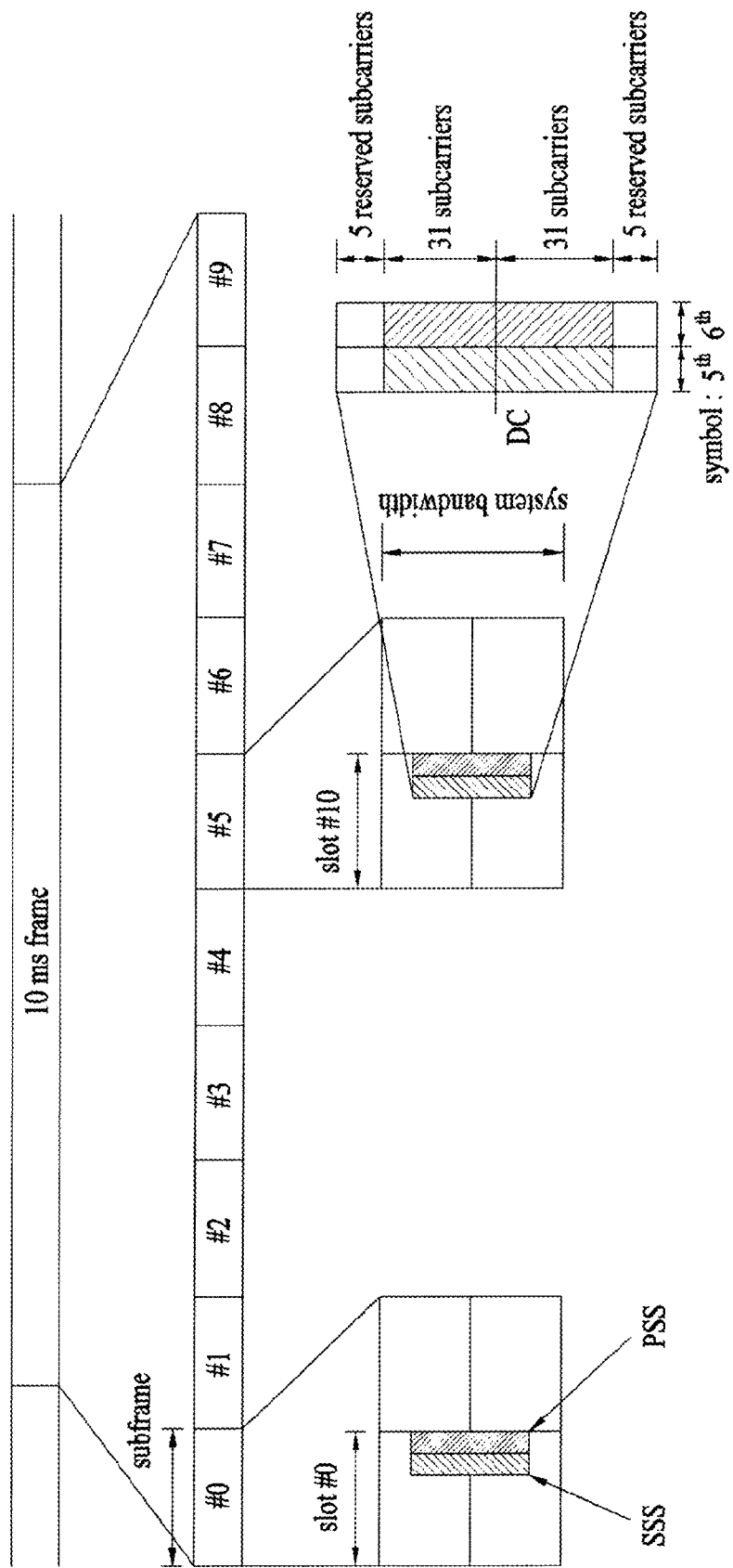
FIG. 4 to FIG. 6 show examples of a synchronization channel (SCH)
Figure 5:
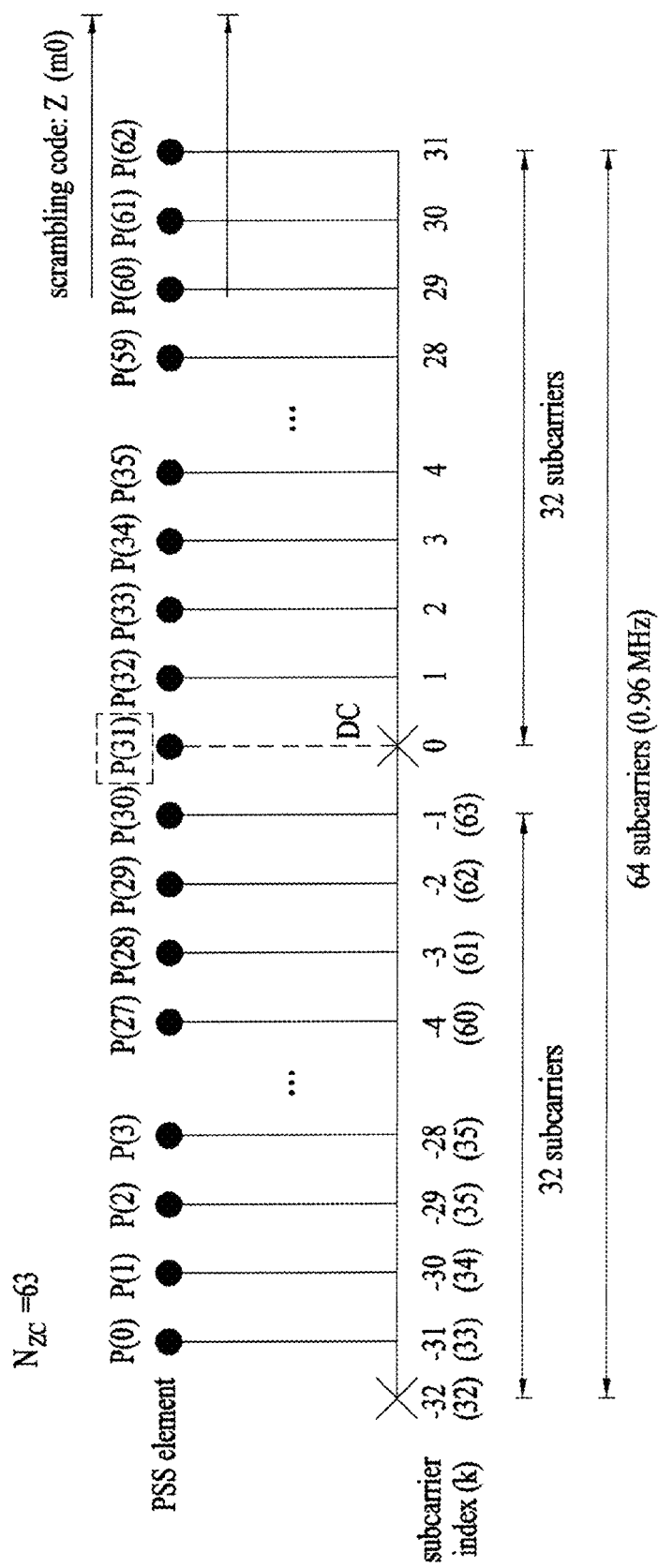
Figure 6:
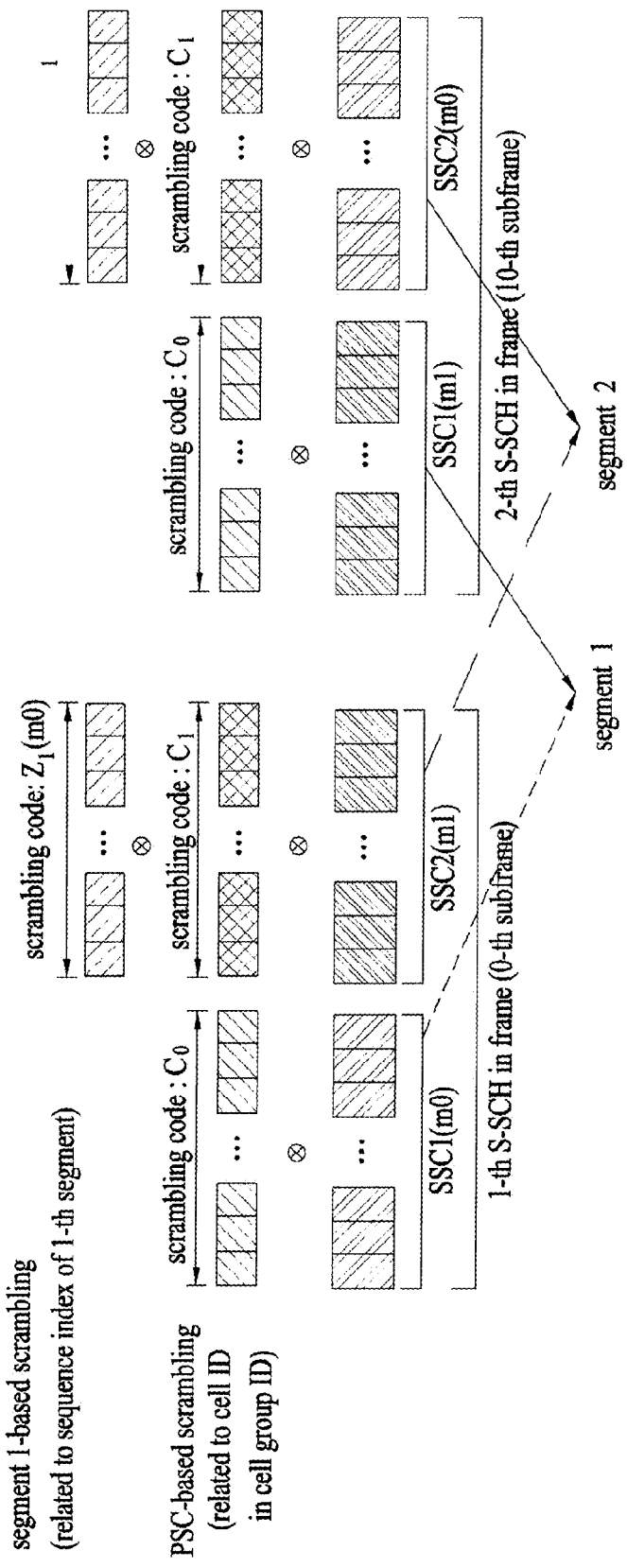

FIG. 4 to FIG. 6 show examples of a synchronization channel (SCH). When a user equipment initially accesses a network, the user equipment acquires DL time synchronization of a base station and base station identification information (e.g., base station ID (identifier), cell ID) by detecting an SCH. Moreover, the user equipment is consistently matched with the DL time synchronization using the SCH even after accessing the network. In case of performing a handover, the user equipment can acquire time synchronization of a target base station and base station identification information by detecting an SCH of the target base station.

Referring to FIG. 4, an SCH includes a P-SCH (primary synchronization channel) and an S-SCH (secondary synchronization channel). The P-SCH is positioned at a last OFDM symbol of a slot #0 and a slot #10. The P-SCH is transmitted using 72 subcarriers (10 sub-carriers are reserved and a PSS is transmitted on 62 subcarriers) in a corresponding OFDM symbol. An identical PSS (primary synchronization signal) is transmitted on 2 P-SCHs. A code used for the PSS can be called a PSC (primary synchronization code). The P-SCH is used to acquire time domain synchronization including OFDM symbol synchronization, slot synchronization and the like and/or frequency domain synchronization. A ZC (Zadoff-Chu) sequence can be used as a PSS.

The ZC sequence is one of CAZAC (constant amplitude zero auto-correlation) sequences which are orthogonal sequences. $N_{ZC}$ is compared with a length of a CAZAC sequence, which is a positive integer, and u (root index) is compared with the $N_{ZC}$. If it corresponds to a prime number (u is a natural number less than the $N_{ZC}$ and a prime number with the $N_{ZC}$), a $k^{th}$ element of a IP CAZAC sequence can be represented as Equation 1 in the following (k=0, 1, . . . , $N_{ZC}$−1).

$$d^u(k) = \exp\left\{-j\frac{\pi uk(k+1)}{N_{ZC}}\right\} \quad \text{[Equation 1]}$$

when $N_{ZC}$ is odd number $$d^u(k) = \exp\left\{-j\frac{\pi uk^2}{N_{ZC}}\right\}$$

when $N_{ZC}$ is even number

The CAZAC sequence may have three characteristics as follow.

$$|d(k)| = 1 \quad \text{[Equation 2]}$$
for all $k$, $N_{ZC}$, $u$ $$R_{u;N_{ZC}}(m) = \begin{cases} 1, & \text{for } m = 0 \\ 0, & \text{for } m \neq 0 \end{cases} \quad \text{[Equation 3]}$$

$$R_{u_1;u_2;N_{ZC}}(m) = \text{const} \quad \text{[Equation 4]}$$
for all $u_1$, $u_2$ Equation 2 means that the CAZAC sequence always has a size of 1. And, Equation 3 means that auto correlation of the CAZAC sequence is represented by a Dirac-delta function. The auto correlation is based on circular correlation. Equation 4 means that cross correlation is always a constant number.

In LTE/LTE-A, a P-SCH is regulated by a ZC sequence of 62-long according to Equation 5 as follows.

$$d_u(n) = \begin{cases} e^{-j\frac{\pi un(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 5]}$$

In this case, a root index u of the ZC sequence is given in Table 1 as follows.

TABLE 1

| $N_{ID}^{(2)}$ | Root index u |
|---|---|
| 0 | 25 |
| 1 | 29 |
| 2 | 34 |

FIG. 5 shows an example of mapping a PSS to a subcarrier. Referring to FIG. 5, a ZC sequence of 63-long ($N_{ZC}$) is mapped to 64 subcarriers including a DC subcarrier. The ZC sequence is firstly mapped to a subcarrier situating at the very left in order to map a $31^{st}$ element P (31) of the ZC sequence to the DC subcarrier. A null value is inserted to a subcarrier ($32^{nd}$ subcarrier) to which a sequence is not mapped in a mapping section. The DC subcarrier is punched.

Referring back to FIG. 4 again, an S-SCH is positioned at an OFDM symbol immediately before a last OFDM symbol of a slot #0 and a slot #10. The S-SCH and a P-SCH are positioned at contiguous OFDM symbols. The S-SCH is transmitted using 72 subcarriers (10 subcarriers are reserved and an SSS is transmitted on 62 subcarriers) in a corresponding OFDM symbol. SSSs (secondary synchronization signals) different from each other are transmitted on 2 S-SCHs. The S-SCH is used to obtain frame synchronization, cell group ID and/or CP configuration of a cell (i.e., use information of a normal CP or an extended CP). Since 2 SSSs are used for a single S-SCH, last information is transmitted by a combination of two short codes (hereinafter m0 and m2). The code used for the SSS is called an SSC (secondary synchronization code). Total 31 SSCs can be generated by a circular shift of 31-long m-sequence, which is generated by a multinomial expression x^5+x^2+1. Hence, two 31-long m-sequences are mapped to the S-SCH.

A code combination (m0 and m1), which is mapped to the S-SCH, can be defined as Equation 6 in the following.

$$m_0 = m' \bmod 31$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor,$$
$$q' = \lfloor N_{ID}^{(1)}/30 \rfloor$$

[Equation 6]

A relation between a cell group ID and the code combination (m0 and m1) can be defined as Table 2 in the following.

TABLE 2

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |

TABLE 2-continued

| $N_{ID}^{(1)}$ | Error! Objects cannot be created from editing field codes. | Error! Objects cannot be created from editing field codes. |
|---|---|---|
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |

Referring to FIG. 6, an order of the m0 and the m1 varies according to a subframe and the order is used to estimate synchronization of a radio frame. For instance, (m0, m1) is transmitted in a (0-)$^{th}$ subframe and (m1, m0) is transmitted in a (10-)$^{th}$ subframe. Meanwhile, if a cell A has a combination of (1, 2) and a cell B has an SSS of a combination of (3, 4), it is possible for a user equipment to incorrectly detect it as a combination of (1, 4) and (3, 2). To prevent this, an SSC can be scrambled by a code one-to-one defined with a PSC. For instance, if the cell A and the cell B use PSCs different from each other, respectively, and each of the cells scrambles the SSC with a PSC-based code of their own, probability of misdetection for the (1, 2) combination and the (3, 4) combination is reduced. A PSC-based scrambling code includes the 31-long m-sequence, which is generated from the multinomial expression x^5+x^2+1. Six sequences are generated by a circular shift and two sequences correspond to three PSC indexes. Yet, in case that the cell A and the cell B use an identical PSC code, there still exist possibility of misdetection for the SSC. Hence, segment 1-based scrambling can be additionally performed. In particular, an SSC of a segment 2 can be scrambled by a code corresponding to an index of a segment 1. A segment 1-based scrambling code includes a 31-long m-sequence generated from a multinomial expression x^5+x^4+x^2+x^1+1. Eight sequences are generated by a circular shift and each sequence corresponds to indexes of the segment 1 in a manner of one-to-many.

In the following description, an SSC and a scrambling code are explained using equations. For sequences d (0), . . . , d (61) used for an SSS, two 31-long binary sequences are combined with each other in a manner of being interleaved. The combined sequences are scrambled by a scrambling code given by a PSS. The combination of two 31-long sequences defining the SSS varies depending on a subframe 0 and a subframe 5. The combination can be represented as Equation 7 in the following.

$$d(2n) = \begin{cases} s_0^{(m_0)}(n)c_0(n) & \text{in subframe } 0 \\ s_1^{(m_1)}(n)c_0(n) & \text{in subframe } 5 \end{cases}$$

$$d(2n+1) = \begin{cases} s_1^{(m_1)}(n)c_1(n)z_1^{(m_0)}(n) & \text{in subframe } 0 \\ s_0^{(m_0)}(n)c_1(n)z_1^{(m_1)}(n) & \text{in subframe } 5 \end{cases}$$

[Equation 7]

In this case, n equals to 0 or greater than 0 and the n equals to 30 or less than 30. Both $m_0$ and $m_1$ are related to a physical cell ID (PCID) group (Ng) and can be defined by Equation 6 and Table 2. A sequence $s_0^{(m_0)}(n)$ and a sequence $s_1^{(m_1)}(n)$ can be obtained by a circular shift of an m-sequence $\tilde{s}(n)$ as depicted in Equation 8 in the following.

$$s_0^{(m_0)}(n) = \tilde{s}((n+m_0) \mod 31)$$

$$s_1^{(m_0)}(n) = \tilde{s}((n+m_1) \mod 31)$$ [Equation 8]

In this case, $\tilde{s}(i)=1-2x(i)$, $0 \le i \le 30$, $x(\bar{i}+5)=(x(\bar{i})) \mod 2$, $0 \le \bar{i} \le 25$. An initial condition corresponds to $x(0)=0$, $x(1)=0$, $x(2)=0$, $x(3)=0$, $x(4)=1$.

A scrambling sequence $c_0(n)$ and $c_1(n)$ are based on a PSS and can be obtained by a circular shift of an m-sequence (n) as depicted in Equation 9 in the following.

$$c_0(n) = \tilde{c}((n+N_{ID}^{(2)}) \mod 31)$$

$$c_1(n) = \tilde{c}((n+N_{ID}^{(2)}+3) \mod 31)$$ [Equation 9]

In this case, $N_{ID}^{(2)} \in \{0, 1, 2\}$ indicates a physical cell ID in a physical cell ID group ($N_{ID}^{(1)}$)). In this case, $\tilde{c}(i)=1-2x(i)$, $0 \le i \le 30$, and $x(\bar{i}+5)=(x(\bar{i}+3)+x(\bar{i})) \mod 2$, $0 \le \bar{i} \le 25$. An initial condition corresponds to $x(0)=0$, $x(1)=0$, $x(2)=0$, $x(3)=0$, $x(4)=1$.

A scrambling sequence $z_1^{(m_0)}(n)$ and $z_1^{(m_1)}(n)$ can be obtained by a circular shift of an m-sequence $\tilde{z}(n)$ as depicted in Equation 10 in the following.

$$z_1^{(m_0)}(n) = \tilde{z}((n+(m_0 \mod 8)) \mod 31)$$

$$z_1^{(m_1)}(n) = \tilde{z}((n+(m_1 \mod 8)) \mod 31)$$ [Equation 10]

In this case, both $m_0$ and $m_1$ are identical to what is defined in the above. $\tilde{z}(i)=1-2x(i)$, $0 \le i \le 30$, and $x(\bar{i}+5)=(x(\bar{i}+4)+x(\bar{i}+2)+x(\bar{i}+1)+x(\bar{i})) \mod 2$, $0 \le \bar{i} \le 25$. An initial condition corresponds to $x(0)=0$, $x(1)=0$, $x(2)=0$, $x(3)=0$, $x(4)=1$.

A last physical cell ID is defined as $N_{ID}^{cell}=3N_{ID}^{(1)}+N_{ID}^{(2)}$ by a combination of $N_{ID}^{(2)}$ of a PSS and $N_{ID}^{(1)}$ of an SSS. Currently, 504 (=3*168) physical IDs are defined in LTE.

Figure 7:
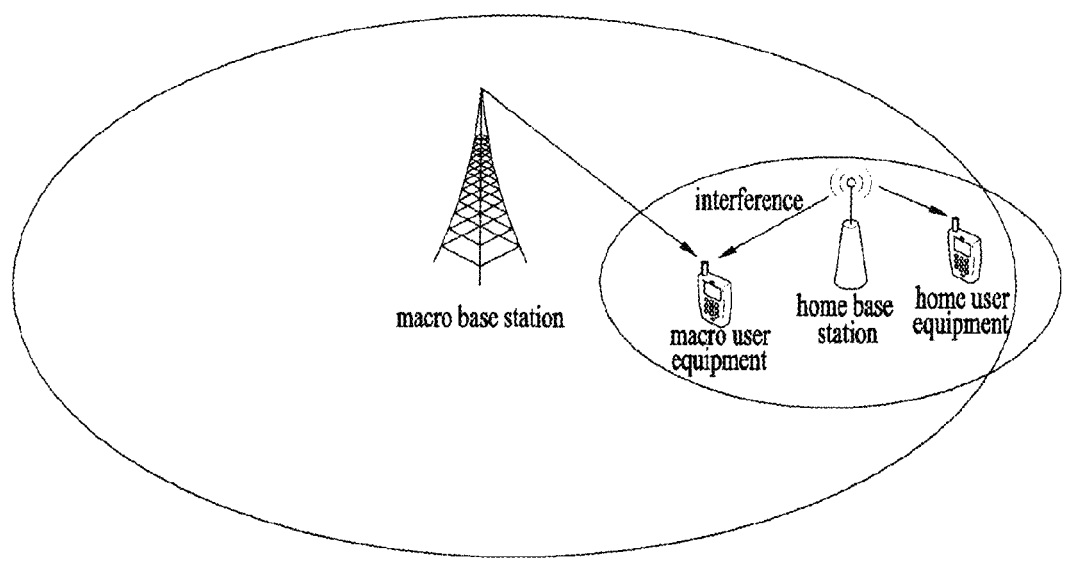
FIG. 7 is a diagram for an example of a heterogeneous network (HetNet) including a macro cell and a micro cell and interference occurs in the heterogeneous network.

FIG. 7 is a diagram for an example of a heterogeneous network (HetNet) including a macro cell and a micro cell. In a next generation communication standard including LTE-A, a heterogeneous network, which includes a micro cell of low transmit power existing within a cell coverage of a legacy macro cell in a manner of being overlapped with each other, is under discussion.

Referring to FIG. 7, a macro cell can be overlapped with one or more micro cells. A service of the macro cell is provided by a macro eNB (Macro eNode B, M eNB). In the present specification, the macro cell and the macro eNB can be used in a manner of being mixed. A UE accessed the macro cell can be called a macro UE (Macro UE, MUE). The macro UE receives a signal from the macro eNB and transmits a signal to the macro eNB.

The micro cell can also be called a femto cell or a pico cell. A service of the micro cell is provided by a pico eNB (Pico eNode B), a femto eNB (Femto eNode B), a home eNB (Home eNode B, HeNB), a relay node (RN), or the like. For clarity, an example of a case that the home eNB is positioned within the macro cell is depicted in the diagram. Unless there is a special distinction in the present specification, the micro eNB, the micro cell, the pico eNB, the pico cell, the femto eNB, the femto cell, the home eNB, a home cell, the relay node, a relay cell can be used in a manner of being mixed. A UE accessed the micro cell can be called a micro UE, a pico UE (PUE), a femto UE (FUE), a home UE (HUE) or the like. The micro UE receives a signal from the micro eNB (e.g., femto eNB, pico eNB) and transmits a signal to the micro eNB.

Since a macro cell is overlapped with a micro cell in a heterogeneous network, inter-cell interference becomes more serious problem. As shown in FIG. 7, in case that a macro UE is positioned at the boundary of the macro cell and the micro cell, a DL signal of a HeNB may affect an MUE as interference and a DL signal of an MeNB may affect a HUE as interference. And, a UL signal of the MUE may affect the HeNB and a UL signal of the HUE may affect the MeNB as interference.

Moreover, the HeNB performs a service for a specific HUE only and remaining UEs may correspond to a CSG (closed subscriber group) which is not accessible. In this case, although the MUE is located in the vicinity of the HeNB, since the MUE is unable to access the HeNB, a transmission signal of the HeNB may affect the MUE as strong interference. Consequently, the MUE experiences disorder of receiving a signal from the MeNB.

As one of methods of resolving inter-cell interference, the HeNB reduces a transmit power or stops transmitting on a specific timing point and the MeNB transmits a signal to the MUE without interference from the HeNB on the timing point. This method is effective for interference mitigation in a PSS and an SSS, which are used by a UE to acquire time synchronization. A specific sequence, which is determined by a cell ID, is repeatedly transmitted in every radio frame in the PSS/SSS. Hence, if the PSS/SSS of the MeNB is collided with the PSS/SSS of the HeNB, quality of the PSS/SSS is not improved since interference from the HeNB is accumulated together despite measurement value of the PSS/SSS is accumulated for a long time.

Figure 8:
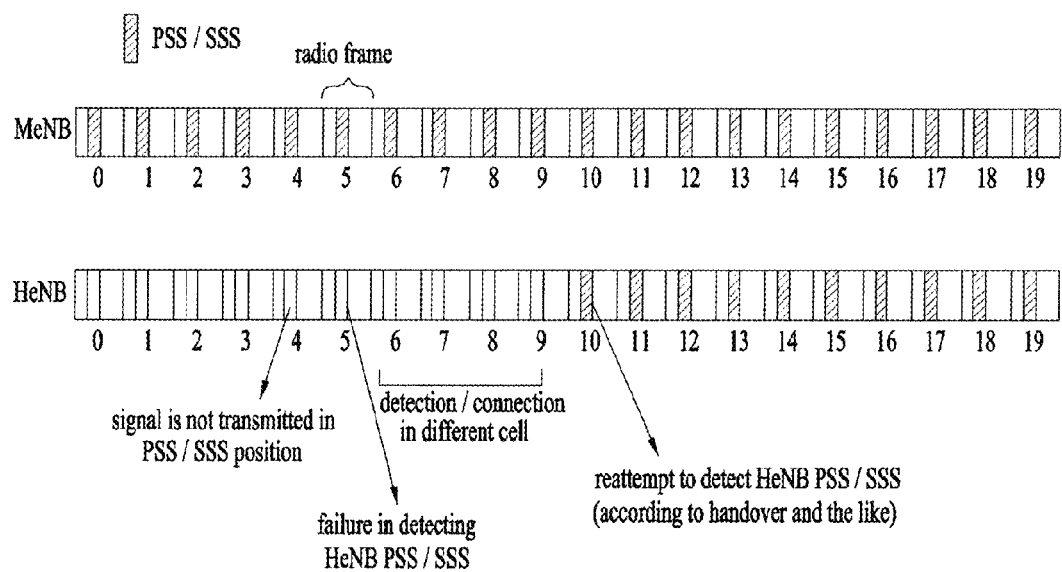
FIG. 8 is a diagram for an example of a problem in case of acquiring synchronization according to a legacy method of resolving inter-cell interference.

FIG. 8 shows an example of operation that the HeNB does not transmit the PSS/SSS of the HeNB in a part of radio frames to protect the PSS/SSS of the MeNB. Referring to FIG. 8, the HeNB repeats an operation of not transmitting the PSS/SSS in a first 10 radio frames and transmitting the PSS/SSS again in a following 10 radio frames. This operation may become a considerable help for synchronization of the MUE. On the contrary, this operation may become obstacles for synchronization of the HUE. In particular, a part of the HUE attempts synchronization in a region where the HeNB does not transmits the PSS/SSS. Consequently, since the part of the HUE is unable to obtain the synchronization of the HeNB, it may perform an inappropriate operation, i.e., searching for a different cell, and the like. In particular, the HUE may be connected to the MeNB as a result of detecting the PSSS/SSS of the MeNB. Yet, the MeNB can move the HUE to the HeNB again for a purpose of load distribution and the like. In this case, the HUE makes an attempt to detect the PSS/SSS of the HeNB again according to a handover process and can be connected to the HeNB when synchronization is acquired by the HeNB. Consequently, the HUE performs an unnecessary handover process. Hence, service delay from the HeNB, resource waste due to the handover, and the like may occur.

In order to solve the aforementioned problems, if one of cells performs an operation of mitigating interference affecting a neighboring cell in a manner of reducing (including a case that the transmit power is set to 0) transmit power for a part or all DL channels/signals for a predetermined time, the present invention proposes a process for a user equipment to efficiently detect a signal of each cell.

Specifically, the present invention proposes that a user equipment recognizes PSS/SSS transmission pattern of a HeNB in a process of acquiring synchronization of the HeNB and uses the PSS/SSS transmission pattern. For instance, the HeNB can repeat an operation of transmitting PSS/SSS for a predetermined time (e.g., T1 number of radio frames) (T1: positive integer) and an operation of not transmitting the PSS/SSS for a following predetermined time (e.g., T2 number of radio frames) (T2: positive integer) and the user equipment can acquire synchronization of the HeNB using the PSS/SSS transmission pattern of the HeNB. In this case, a value of the T1 may mean a minimum number or a maximum number (preferably, minimum number) of radio frames in which the HeNB PSS/SSS is contiguously transmitted. Similarly, a value of the T2 may mean a minimum number or a maximum number (preferably, maximum number) of radio frames in which the HeNB PSS/SSS is not contiguously transmitted. For instance, if the HeNB begins to transmit the PSS/SSS, PSS/SSS transmission can last for at least T1 number of radio frames. And, the HeNB may be able to not transmit the PSS/SSS for maximum T2 number of radio frames. The PSS/SSS can be transmitted after the T2 number of radio frames are passed by.

A user equipment (e.g., HUE) recognizes a HeNB PSS/SSS transmission pattern and may be able to operate as follows. First of all, assume that the user equipment fails to detect a HeNB PSS/SSS on a specific timing point. In this case, instead of judging that a HeNB cell does not exist, the user equipment can assume that HeNB PSS/SSS transmission may previously exist in maximum T2+a (a is an integer greater than 0, preferably greater than 1) radio frames. Hence, in spite of a failure of detecting the HeNB PSS/SSS, the user equipment can make an attempt to continuously detect the HeNB PSS/SSS for at least T2+a radio frames. By doing so, the user equipment can avoid a process of searching for a different cell despite of a failure of acquiring synchronization on a specific timing point on which the HeNB PSS/SSS is not transmitted.

Figure 9:
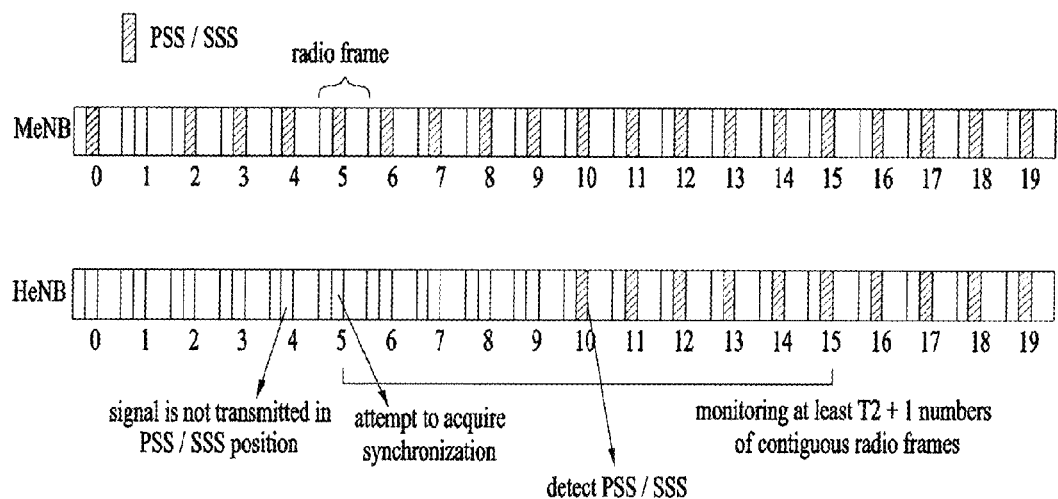
FIG. 9 is a diagram for an example of a method of acquiring synchronization according to embodiment of the present invention.

FIG. 9 is a diagram for an example of a process of acquiring synchronization according to embodiment of the present invention.

Referring to FIG. 9, a user equipment (e.g., HUE) initially makes an attempt to DL synchronize for a HeNB in a radio frame #5. Yet, the user equipment fails to synchronize since there is no HeNB PSS/SSS transmission in the corresponding radio frame. In this case, the user equipment expects that at least one HeNB PSS/SSS transmission shall be performed before T2+a (e.g., a=1) number of radio frames are passed by and can make an attempt to detect the HeNB PSS/SSS for at least T2+a (e.g., a=1) number of contiguous radio frames. In this case, the user equipment can detect the HeNB PSS/SSS transmitted in a radio frame #10. If the user equipment fails to detect the HeNB PSS/SSS after the T2 numbers of radio frames are passed by, the user equipment can judge that synchronization of a corresponding HeNB cell is unable to be acquired. Although FIG. 9 shows a case that the user equipment makes an attempt to detect the HeNB PSS/SSS in an additional radio frame after the T2 number of radio frames are passed by, a can be variously configured. For instance, after the T2 number of radio frames are passed by, the user equipment can make an attempt to detect the HeNB PSS/SSS for additional maximum T1 number of radio frames. In particular, a can be configured as follows. $01 \leq a \leq T1$, preferably, $1 \leq a \leq T1$.

In the foregoing description, a process of acquiring synchronization, which is acquired by a user equipment using a PSS/SSS transmission pattern of a HeNB, is mainly explained. Yet, the contents proposed by the present invention can also be used to acquire synchronization of a MeNB in a situation that there exists the HeNB using the PSS/SSS transmission pattern. For instance, the HeNB causes interference to a MeNB PSS/SSS in a manner of transmitting a PSS/SSS on a specific timing point on which a user equipment (e.g., MUE) intends to acquire synchronization of a MeNB. As a result, the user equipment may fail to detect the MeNB PSS/SSS and acquire synchronization. In this case, instead of giving up an access to the corresponding MeNB, the user equipment can make an attempt to detect the MeNB PSS/SSS in T1+b (b is an integer greater than 0, preferably greater than 1) number of radio frames. In particular, if the user equipment fails to detect the MeNB PSS/SSS, the user equipment expects that PSS/SSS interference transmitted from the HeNB is disappeared before a predetermined time (e.g., if maximum value of radio frames in which the PSS/SSS is contiguously transmitted by the HeNB corresponds to T1 number of radio frames, T1 number of radio frames) is passed by and can continuously make an attempt to synchronize with the MeNB. In this case, synchronization with the MeNB can be performed by an operation of consistently reattempting synchronization with the MeNB for a predetermined time (e.g., if minimum value of radio frames in which the PSS/SSS is not contiguously transmitted by the HeNB corresponds to T2 number of radio frames, T2 number of radio frames) after the T1 number of ratio frames and the like. To this end, whether a user equipment uses an assumption that the PSS/SSS interference is mitigated on a predetermined timing point when MeNB synchronization is attempted in a specific MeNB cell region (among a whole network) and/or various parameters related to the assumption may be delivered to the user equipment from the MeNB and/or HeNB via system information, an RRC (radio resource control) signaling, or the like.

Figure 10:
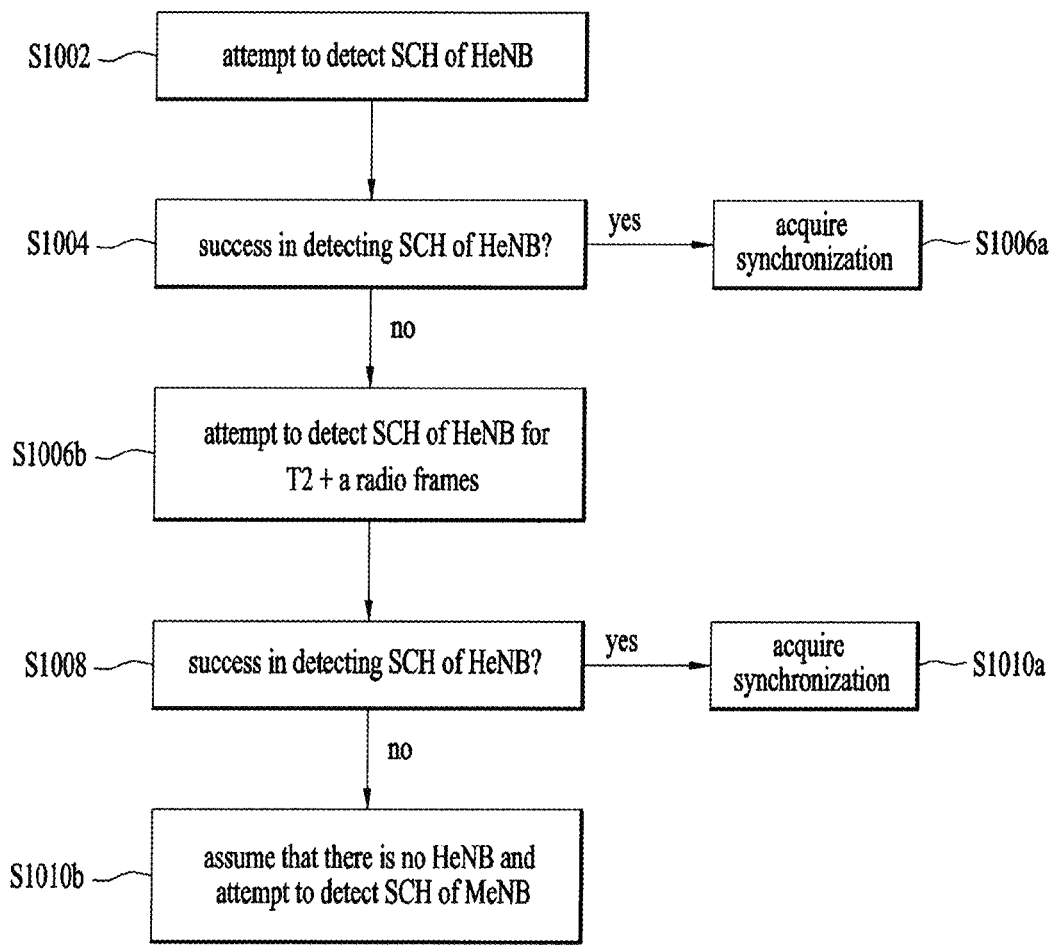
FIG. 10 to FIG. 11 show examples of a process of acquiring synchronization according to embodiment of the present invention.
Figure 11:
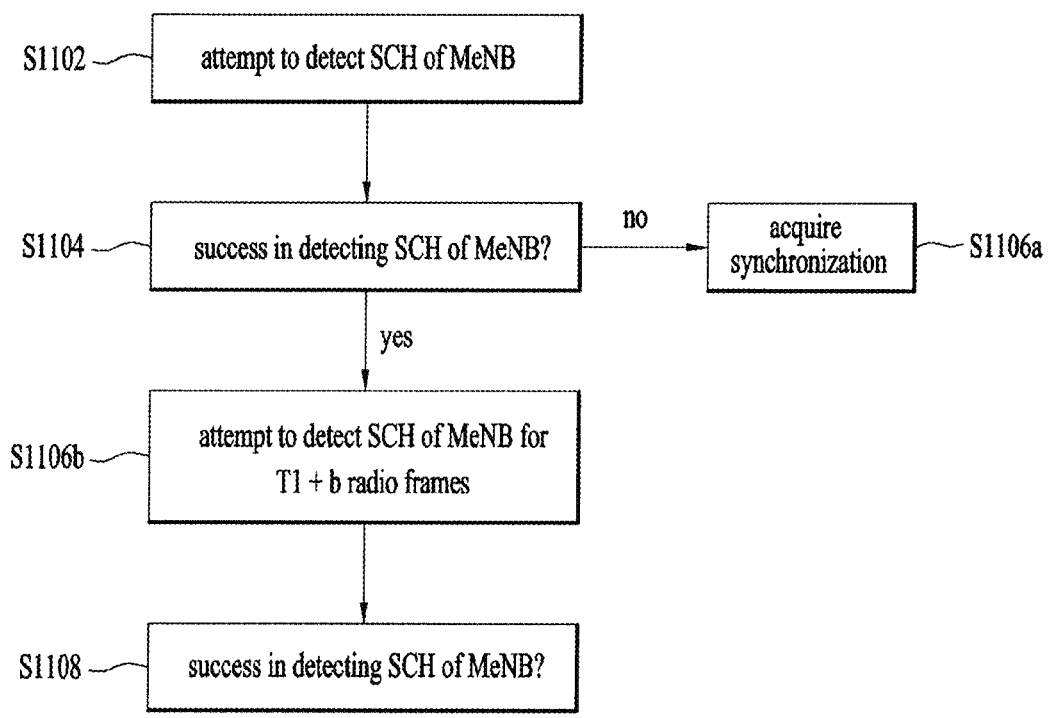

FIG. 10 to FIG. 11 shows examples of a process of acquiring synchronization according to embodiment of the present invention. FIG. 10 shows an example of a process of acquiring synchronization with a HeNB and FIG. 11 shows an example of a process of acquiring synchronization with a MeNB.

Referring to FIG. 10, a user equipment makes an attempt to detect an SCH of HeNB to acquire synchronization [S1002]. Depending on a system, the SCH may be differently called or configured. In case of a 3GPP system, the SCH includes a P-SCH and an S-SCH. In case of a 802.16m system, the SCH includes a PA-preamble (primary advanced preamble) and an SA-preamble (secondary advanced preamble). If the HeNB SCH is successfully detected [S1004], the user equipment acquires DL synchronization of the HeNB and may be then able to recognize a PCID of the HeNB from the DL synchronization [S1006*a*].

Meanwhile, if the user equipment fails to detect the HeNB SCH [S1004], the user equipment can make an attempt to detect the HeNB SCH while continuously monitoring the HeNB SCH for T2+a radio frames [S1006*b*]. In particular, if the user equipment fails to detect the HeNB SCH, the user equipment assumes that there may exist HeNB SCH transmission within at least T2+a radio frames instead of assuming that there is no HeNB. In this case, MeNB SCH detection attempt may be restricted in the monitoring process. In this case, the T2 may mean the (maximum) number of radio frames in which the HeNB SCH is not contiguously transmitted. 'a' is an integer equals to 0 or greater than 0, preferably, an integer equals to 1 or greater than 1. An upper limit of the 'a' can be limited to a T1. The T1 may means the (minimum) number of radio frames in which the HeNB SCH is contiguously transmitted. Acquisition of the T1 and/or the T2 shall be described in detail later. In the monitoring process according to the step S1006*b*, if the HeNB SCH is successfully detected [S1008], the user equipment acquires DL synchronization of the HeNB and may be then able to recognize a PCID of the HeNB from the DL synchronization [S1010*a*]. Meanwhile, if the user equipment fails to detect the HeNB SCH in the monitoring process according to the step S1006*b*, the user equipment assumes that there is no HeNB and may be then able to make an attempt to detect an SCH of a different base station (e.g., MeNB) [S1010*b*].

The process of FIG. 10 may be restricted to be performed only for a case that the user equipment knows existence of the HeNB in advance (via a neighbor cell list and the like) or a case that the user equipment is signaled to perform the operation of FIG. 10. This sort of information can be delivered to the user equipment via system information or an upper layer signaling (e.g., RRC signaling). And, the process of FIG. 10 can be performed for a case that the user equipment accesses the HeNB rather than the MeNB. In this case, detection attempt for the MeNB can be restricted except the S1010*b* step.

Subsequently, referring to FIG. 11, a user equipment makes an attempt to detect an SCH of MeNB to acquire synchronization [S1102]. If the MeNB SCH is successfully detected [S1104], the user equipment acquires DL synchronization of the MeNB and may be then able to recognize a PCID of the MeNB from the DL synchronization [S1106*a*]. Meanwhile, if the user equipment fails to detect the MeNB SCH [S1104], the user equipment can make an attempt to detect the MeNB SCH while continuously monitoring the MeNB SCH for T1+b radio frames [S1106*b*]. In particular, if the user equipment fails to detect the MeNB SCH, the user equipment assumes that the failure of the MeNB SCH detection is caused by interference of a difference cell (e.g., HeNB) and the interference from the different cell is mitigated within at least T1+b radio frames. In this case, HeNB SCH detection attempt may be restricted in the monitoring process. In this case, the T1 may mean the (minimum) number of radio frames in which the HeNB SCH is contiguously transmitted. 'b' is an integer equals to 0 or greater than 0, preferably, an integer equals to 1 or greater than 1. An upper limit of the 'b' can be limited to a T2. The T2 may means the (maximum) number of radio frames in which the HeNB SCH is not contiguously transmitted. Acquisition of the T1 and/or the T2 shall be described in detail later. Via the monitoring process according to the step S1106*b*, the user equipment detects the SCH of the MeNB, acquires DL synchronization of the MeNB, and may be then able to recognize a PCID of the HeNB from the DL synchronization [S1108].

For the operations proposed by the present invention, the user equipment (HUE and/or MUE) should recognize a value of the T1 and/or the T2. To this end, the MeNB and/or the HeNB can inform the user equipment of information on at least one of a cell ID, a cell ID used for a micro cell (e.g., CSG cell), whether a non-contiguous PSS/SSS signal transmission pattern is used, the value of the T1 and/or the T2 via system information, a dedicated RRC (radio resource control) signal, and the like. Or, since synchronization is an operation initially performed after power of the user equipment is turned on, it may be more difficult to transmit the aforementioned information via a separate signaling. In this case, it may consider a scheme of acquiring the value of the T1 and/or the T2 via a cell ID of a cell with which synchronization is to be matched. As an example, in case of a cell ID (e.g., HeNB cell ID, CSG cell ID) belonging to a specific group, the T1 and/or the T2 can be automatically set to a corresponding value. In this case, the user equipment recognizes the T1 and/or the T2 although there is no separate signaling and may be able to perform a process of acquiring base station synchronization. For instance, since a PSS/SSS sequence is determined by a corresponding cell ID (refer to FIG. 4 to FIG. 6), if a HUE performs synchronization with a base station (e.g., HeNB) including a specific cell ID, the HUE can perform the proposed operations in a manner of assuming the value of the T1 and/or the T2 determined by the corresponding cell ID.

Figure 12:
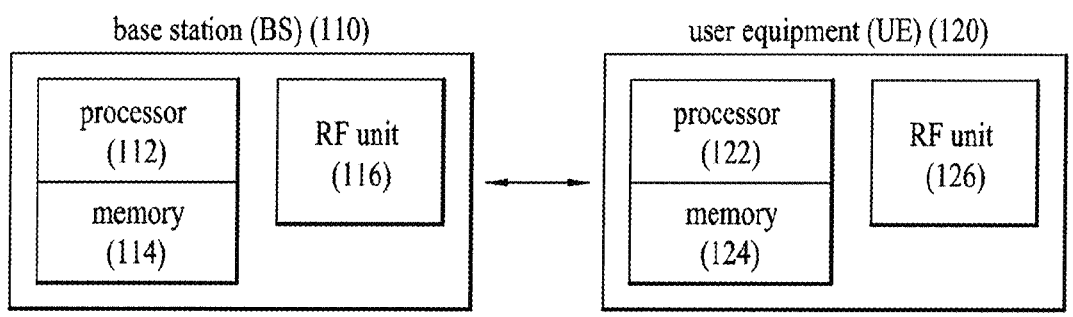
FIG. 12 is a diagram for an example of a base station and a user equipment to which embodiment of the present invention is applicable.

FIG. 12 is a diagram for an example of a base station and a user equipment to which embodiment of the present invention is applicable.

Referring to FIG. 12, a wireless communication system includes a base station (BS) 110 and a user equipment (UE) 120. The BS includes a processor 112, a memory 114, and a radio frequency (RF) unit 116. The processor 112 can be configured to implement procedure and/or methods proposed by the present invention. The memory 114 is connected with the processor 112 and stores various informations related to the operation of the processor 112. The RF unit 116 is connected with the processor 112 and transceive a radio signal. The UE 120 includes a processor 122, a memory 124, and a radio frequency (RF) unit 126. The processor 122 can be configured to implement procedure and/or methods proposed by the present invention. The memory 124 is connected with the processor 122 and stores various informations related to the operation of the processor 122. The RF unit 126 is connected with the processor 122 and transceive a radio signal. The BS 110 and/or the UE 120 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the data transmission/reception relations between a UE and a base station. In this disclosure, a specific operation explained as performed by a base station can be occasionally performed by an upper node of the base station. In particular, in a network constructed with a plurality of network nodes including a base station, it is apparent that various operations performed for communication with a user equipment can be performed by a base station or other networks except the base station. In this case, 'base station' can be replaced by such a terminology as a fixed station, a Node B, an eNode B (eNB), an access point, and the like. And, 'user equipment' can be replaced by such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention can be used by such a wireless communication device as a user equipment, a relay, a base station, and the like.

What is claimed is:

1. A method for acquiring time synchronization in a wireless communication system, the method comprising:
   obtaining a non-contiguous transmission pattern of a synchronization channel;
   initially attempting to detect the synchronization channel of a base station; and
   re-attempting to detect the synchronization channel of the base station for a predetermined time if the initial attempt at detection fails, wherein if the base station corresponds to a first type, the predetermined time is set to equal to or greater than a first duration for which a synchronization channel is not contiguously transmitted in the non-contiguous transmission pattern, and if the base station corresponds to a second type, the predetermined time is set to equal or greater than a second duration for which a synchronization channel is contiguously transmitted in the non-contiguous transmission pattern.

2. The method of claim 1, wherein the first duration is set to equal a maximum duration for which a synchronization channel is not contiguously transmitted in the non-contiguous transmission pattern in a manner of being equal to the maximum duration or greater than the maximum duration.

3. The method of claim 1, wherein the second duration is set equal to a minimum duration for which a synchronization channel is contiguously transmitted in the non-contiguous transmission pattern in a manner of being equal to the minimum duration or greater than the minimum duration.

4. The method of claim 1, wherein the non-contiguous transmission pattern of the synchronization channel is defined for the first type base station.

5. The method of claim 4, wherein the first type base station comprises a home base station and wherein the second type base station comprises a macro base station.

6. The method of claim 1, wherein the information on the non-contiguous transmission pattern of the synchronization channel is predetermined according to a cell identifier.

7. A communication device configured to acquire time synchronization in a wireless communication system, comprising:
  a radio frequency (RF) unit; and
  a processor configured to:
    obtain a non-contiguous transmission pattern of a synchronization channel;
    initially attempt to detect a synchronization channel of a base station; and
    re-attempt to detect the synchronization channel of the base station for a predetermined time if the detection fails, wherein if the base station corresponds to a first type, the predetermined time is set to equal or greater than a first duration for which the synchronization channel is not contiguously transmitted in the non-contiguous transmission pattern, and if the base station corresponds to a second type, the predetermined time is set to equal or greater than a second duration for which a synchronization channel is contiguously transmitted in the non-contiguous transmission pattern.

8. The communication device of claim 7, wherein the first duration is set equal to a maximum duration for which a synchronization channel is not contiguously transmitted in the non-contiguous transmission pattern in a manner of being equal to the maximum duration or greater than the maximum duration.

9. The communication device of claim 7, wherein the second duration is set equal to a minimum duration for which a synchronization channel is contiguously transmitted in the non-contiguous transmission pattern in a manner of being equal to the minimum duration or greater than the minimum duration.

10. The communication device of claim 7, wherein the non-contiguous transmission pattern of the synchronization channel is defined for the first type base station.

11. The communication device of claim 10, wherein the first type base station comprises a home base station and the second type base station comprises a macro base station.

12. The communication device of claim 7, wherein the non-contiguous transmission pattern of the synchronization channel is predetermined according to a cell identifier.

\* \* \* \* \*